United States Patent
Tamura et al.

(10) Patent No.: US 7,970,231 B2
(45) Date of Patent: Jun. 28, 2011

(54) IMAGE PROCESSING METHOD

(75) Inventors: Masashi Tamura, Tokyo (JP); Narihiro Matoba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1180 days.

(21) Appl. No.: 10/553,424

(22) PCT Filed: Feb. 19, 2004

(86) PCT No.: PCT/JP2004/001889

§ 371 (c)(1),
(2), (4) Date: Oct. 18, 2005

(87) PCT Pub. No.: WO2005/081542

PCT Pub. Date: Sep. 1, 2005

(65) Prior Publication Data

US 2006/0232690 A1 Oct. 19, 2006

(51) Int. Cl.
*G06K 9/40* (2006.01)
*G06K 9/00* (2006.01)
*H04N 5/00* (2011.01)

(52) U.S. Cl. ........ 382/266; 382/165; 382/167; 382/189; 382/260; 382/264; 382/275; 348/606; 348/615; 348/623

(58) Field of Classification Search ............... 348/606, 348/615, 623; 382/165, 167, 189, 260, 264, 382/266, 275

See application file for complete search history.

(56) References Cited

U.S. PATENT DOCUMENTS

| | | | | |
|---|---|---|---|---|
| 5,200,841 | A | * | 4/1993 | Kotaki et al. ............... 358/2.99 |
| 5,491,759 | A | * | 2/1996 | Nagao et al. ................. 382/199 |
| 6,148,115 | A | * | 11/2000 | Mackinnon et al. ......... 382/266 |
| 6,148,116 | A | * | 11/2000 | Park et al. .................... 382/266 |
| 6,229,578 | B1 | * | 5/2001 | Acharya et al. .............. 348/607 |
| 6,343,146 | B1 | | 1/2002 | Tsuruoka et al. |

(Continued)

FOREIGN PATENT DOCUMENTS

EP 1 315 367 A2 5/2003

(Continued)

OTHER PUBLICATIONS

Fan, et al. "Edge-Preserving Prefiltering for Document Image Binarization." Image Processing, 2001. Proceedings. 2001 International Conference on . 1. (2001): 1070-1073. Print.*

*Primary Examiner* — Matthew C Bella
*Assistant Examiner* — Michael A Newman
(74) *Attorney, Agent, or Firm* — Birch, Stewart, Kolasch & Birch, LLP

(57) ABSTRACT

An image processing method has an edge intensity value calculating section (4) for calculating an edge intensity value in a neighborhood of a pixel of interest from feature values of micro regions calculated by a feature value calculating section (3); an edge intensity value correcting section (5) for correcting the edge intensity value calculated by the edge intensity value calculating section (4) in accordance with an edge intensity correction curve; and a filter value calculating section (6) for calculating a low-pass filter value of the pixel of interest from image signal values of neighboring pixels having the same color component as the pixel of interest. It corrects the image signal value of the pixel of interest by carrying out weighted addition of the image signal value of the pixel of interest and the low-pass filter value using the edge intensity values before and after the correction.

9 Claims, 15 Drawing Sheets

U.S. PATENT DOCUMENTS

| | | | |
|---|---|---|---|
| 6,377,313 B1 * | 4/2002 | Yang et al. | 348/630 |
| 6,526,181 B1 | 2/2003 | Smith et al. | |
| 6,961,476 B2 * | 11/2005 | Atkinson | 382/272 |
| 7,023,487 B1 * | 4/2006 | Adams | 348/448 |
| 7,039,254 B1 * | 5/2006 | Maenaka et al. | 382/300 |
| 7,142,239 B2 * | 11/2006 | Cho | 348/273 |
| 7,149,355 B2 * | 12/2006 | Kubota | 382/199 |
| 2003/0081465 A1 | 5/2003 | Cho | |

FOREIGN PATENT DOCUMENTS

| | | |
|---|---|---|
| JP | 7-236060 A | 9/1995 |
| JP | 2787781 B2 | 6/1998 |
| JP | 10-243407 A | 9/1998 |
| JP | 11-215515 A | 8/1999 |
| JP | 2000-23173 A | 1/2000 |
| JP | 2000-156816 A | 6/2000 |
| JP | 2000-341702 A | 12/2000 |
| JP | 2001-177767 A | 6/2001 |
| JP | 2003-87809 A | 3/2003 |
| JP | 2003-134523 A | 5/2003 |
| JP | 2003-153290 A | 5/2003 |
| JP | 2003-304549 A | 10/2003 |
| WO | WO 99/30547 A2 | 6/1999 |

* cited by examiner

| D(0,0) | D(1,0) | D(2,0) | D(3,0) |
|--------|--------|--------|--------|
| D(0,1) | D(1,1) | D(2,1) | D(3,1) |
| D(0,2) | D(1,2) | D(2,2) | D(3,2) |
| D(0,3) | D(1,3) | D(2,3) | D(3,3) |

FIG.9

| -1 | -1 | -1 | -1 |
|----|----|----|----|
| -1 | 3  | 3  | -1 |
| -1 | 3  | 3  | -1 |
| -1 | -1 | -1 | -1 |

| 0 | 0 | 0 | 0 |
|---|---|---|---|
| 0 | 2 | 2 | 0 |
| 0 | 2 | 2 | 0 |
| 0 | 0 | 0 | 0 |

| 0 | 0 | 0 | 0 | 0 |
|---|---|---|---|---|
| 0 | 0 | 0 | 0 | 0 |
| 0 | 0 | 2 | 0 | 0 |
| 0 | 0 | 0 | 0 | 0 |
| 0 | 0 | 0 | 0 | 0 |

(b)

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

(c)

| 0 | 0 | 0 | 0 | 0 |
|---|---|---|---|---|
| 0 | 0 | 0 | 0 | 0 |
| 0 | 0 | 2 | 0 | 0 |
| 0 | 0 | 0 | 0 | 0 |
| 0 | 0 | 0 | 0 | 0 |

(d)

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

(e)

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

(f)

| 128 | 128 | 128 | 128 | 128 |
|---|---|---|---|---|
| 128 | 128 | 128 | 128 | 128 |
| 128 | 128 | 127 | 128 | 128 |
| 128 | 128 | 128 | 128 | 128 |
| 128 | 128 | 128 | 128 | 128 |

(g)

| 128 | 128 | 128 | 128 | 128 |
|---|---|---|---|---|
| 128 | 128 | 128 | 128 | 128 |
| 128 | 128 | 127 | 128 | 128 |
| 128 | 128 | 128 | 128 | 128 |
| 128 | 128 | 128 | 128 | 128 |

| G | R | G | R | G |
|---|---|---|---|---|
| B | G | B | G | B |
| G | R | G | R | G |
| B | G | B | G | B |
| G | R | G | R | G |

(b)

| 0 | 0 | 0 | 0 | 0 |
|---|---|---|---|---|
| 0 | 0 | 0 | 0 | 0 |
| 0 | 0 | 8 | 0 | 0 |
| 0 | 0 | 0 | 0 | 0 |
| 0 | 0 | 0 | 0 | 0 |

— NOISE (c)

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

(d)

| 0 | 0 | 0 | 0 | 0 |
|---|---|---|---|---|
| 0 | 0 | 2 | 0 | 0 |
| 0 | 2 | 8 | 2 | 0 |
| 0 | 0 | 2 | 0 | 0 |
| 0 | 0 | 0 | 0 | 0 |

(e)

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

(f)

| 0 | 0 | 0 | 0 | 0 |
|---|---|---|---|---|
| 0 | 0 | 1 | 0 | 0 |
| 0 | 1 | 5 | 1 | 0 |
| 0 | 0 | 1 | 0 | 0 |
| 0 | 0 | 0 | 0 | 0 |

(g)

| 128 | 128 | 128 | 128 | 128 |
|---|---|---|---|---|
| 128 | 128 | 127 | 128 | 128 |
| 128 | 127 | 125 | 127 | 128 |
| 128 | 128 | 127 | 128 | 128 |
| 128 | 128 | 128 | 128 | 128 |

(h)

| 128 | 128 | 128 | 128 | 128 |
|---|---|---|---|---|
| 128 | 128 | 127 | 128 | 128 |
| 128 | 127 | 125 | 127 | 128 |
| 128 | 128 | 127 | 128 | 128 |
| 128 | 128 | 128 | 128 | 128 |

FIG.15

| | P(1,0) | | P(3,0) | |
|---|---|---|---|---|
| P(0,1) | | P(2,1) | | P(4,1) |
| | P(1,2) | Pg(2,2) | P(3,2) | |
| P(0,3) | | P(2,3) | | P(4,3) |
| | P(1,4) | | P(3,4) | |

FIG.18

| 0 | 0 | 1 | 1 |
|---|---|---|---|
| 0 | 0 | 1 | 1 |
| 0 | 0 | 1 | 1 |
| 0 | 0 | 1 | 1 |

| 0 | 0 | 1 | 1 |
|---|---|---|---|
| 0 | 1 | 1 | 0 |
| 1 | 1 | 0 | 0 |
| 1 | 0 | 0 | 0 |

| 1 | 0 | 0 | 0 |
|---|---|---|---|
| 0 | 1 | 0 | 0 |
| 0 | 0 | 1 | 0 |
| 0 | 0 | 0 | 1 |

| 0 | 0 | 0 | 0 |
|---|---|---|---|
| 0 | 0 | 0 | 0 |
| 1 | 1 | 1 | 1 |
| 1 | 1 | 1 | 1 |

| P(0,0) | P(1,0) | P(2,0) | P(3,0) | P(4,0) |
|---|---|---|---|---|
| P(0,1) | P(1,1) | P(2,1) | P(3,1) | P(4,1) |
| P(0,2) | P(1,2) | P(2,2) | P(3,2) | P(4,2) |
| P(0,3) | P(1,3) | P(2,3) | P(3,3) | P(4,3) |
| P(0,4) | P(1,4) | P(2,4) | P(3,4) | P(4,4) |

(b) NOISE

| 0 | 0 | 3 | 255 | 20 |
|---|---|---|---|---|
| 0 | 0 | 3 | 255 | 20 |
| 0 | 0 | 8 | 255 | 20 |
| 0 | 0 | 3 | 255 | 20 |
| 0 | 0 | 3 | 255 | 20 |

(c)

| 0 | 2 | 129 | 137 |
|---|---|---|---|
| 0 | 3 | 130 | 137 |
| 0 | 3 | 130 | 137 |
| 0 | 2 | 129 | 137 |

(d)

| 0 | 0 | 1 | 1 |
|---|---|---|---|
| 0 | 0 | 1 | 1 |
| 0 | 0 | 1 | 1 |
| 0 | 0 | 1 | 1 |

(e)

| 0 | 0 | 3 | 255 | 20 |
|---|---|---|---|---|
| 0 | 0 | 5 | 255 | 20 |
| 0 | 0 | 8 | 255 | 20 |
| 0 | 0 | 5 | 255 | 20 |
| 0 | 0 | 3 | 255 | 20 |

(f)

| 0 | 0 | 3 | 255 | 20 |
|---|---|---|---|---|
| 0 | 0 | 4 | 255 | 20 |
| 0 | 0 | 5 | 255 | 20 |
| 0 | 0 | 4 | 255 | 20 |
| 0 | 0 | 3 | 255 | 20 |

IMAGE PROCESSING METHOD

TECHNICAL FIELD

The present invention relates to an image processing method for removing noise from an image signal acquired by an image pickup device.

BACKGROUND ART

An ordinary image processing apparatus has three chips of 2-D image pickup devices such as CCDs, on which additive primary color filters, an R-color filter, a G-color filter and a B-color filter, are attached respectively.

The image processing apparatus employs a multi-chip image pickup method that acquires a piece of full-color image information for one frame by separating an image of a subject input through an optical system at a shoot with a spectral prism, and by launching the separated images onto the three 2-D image pickup devices.

In contrast with this, there is an image processing apparatus including only one 2-D image pickup device that has individual pixels arrayed two-dimensionally, each of which has one of the R-color filter, G-color filter and B-color filter attached to the pixel.

Since this image processing apparatus can obtain only one color signal (one of R, G and B color signals) from each pixel, it employs a single-chip imaging method that acquires full-color image information of the individual pixels in a quasi manner by obtaining unacquirable two color signals by calculations using color signals of the neighboring pixels of the individual pixels.

As compared with the multi-chip image pickup method, the single-chip imaging method can reduce the number of the optical parts of the image pickup device, thereby being able to construct a smaller and cheaper apparatus. Thus, consumer digital still cameras or digital video cameras widely employ the single-chip imaging method.

As described above, the single-chip imaging method acquires a full-color image by generating non-pickup color signals by interpolation of the color signals using image information acquired by the single-chip image pickup device to which the primary color filters are attached. The R, G, B signals of the individual pixels generated by the color interpolation are finally converted into luminance/color difference signals to be subjected to screen display or image compression such as JPEG/MPEG, usually followed by filtering such as noise reduction and contour emphasis of the luminance/color difference signals before the image compression.

In the conventional image processing methods described in the following Relevant Documents 1 and 2, when the image pickup apparatus employs the three-chip image pickup device, a luminance/color difference separation circuit carries out the conversion to the luminance/color difference signals, and when the image pickup apparatus employs the single-chip image pickup device, the luminance/color difference separation circuit carries out the above-mentioned color interpolation, and then the conversion to the luminance/color difference signals.

Then, the conventional image processing methods reduce the noise by performing contour emphasis or noise reduction processing called coring of the luminance/color difference signals converted by the luminance/color difference separation circuit.

As for the conventional image processing method described in the following Relevant Document 3, although it carries out the noise reduction processing during the color interpolation of an image acquired by the single-chip image pickup device, it cannot prevent the noise diffusion caused by the color interpolation because it is only after generating the luminance signal of all the pixels by the color interpolation that the specified low-pass filtering is performed. Furthermore, to configure a pixel window for noise reduction processing of the luminance signal after the color interpolation, an additional line buffer is required.

As for the conventional image processing method described in the following Relevant Document 4, it discloses a technique of carrying out noise elimination processing before performing color interpolation of an image acquired by the single-chip image pickup device. It can reduce noise because the color interpolation does not diffuse the noise.

However, since it carries out noise level detection and correction value calculation using only pixels with the same color component as the pixel of interest in a specified region, it brings about difference in the noise levels, which are detected between adjacent different image acquisition color pixels, particularly at color edges. This deteriorates the continuity of the noise reduction on the screen, and the stability of the image quality. In addition, although it utilizes the noise levels of processed adjacent pixels with the same color recursively during the noise level detection, it has little effect on the reduction of random noise occurring independently of the adjacent pixels. Furthermore, although it decides a region with a high noise level as an edge significant as image information by a fuzzy function, and obviates the noise reduction processing in that region, it cannot reduce noise occurring in the pixels adjacent to the edge, and the noise will be emphasized by the contour emphasis that will be usually used at a post stage.

Relevant Document 1: Japanese patent No. 2787781.
Relevant Document 2: Japanese patent application laid-open No. 2001-177767.
Relevant Document 3: Japanese patent application laid-open No. 2003-87809.
Relevant Document 4: Japanese patent application laid-open No. 2003-153290.

As for the conventional image processing methods with the foregoing configurations, the noise superimposed on the image signal during the photoelectric conversion of the image pickup device, and the noise superimposed on the analog signal after the photoelectric conversion (noise produced by an analog signal processing circuit) are diffused to the neighborhood of the pixel of interest by the color interpolation. Consequently as the number of pixels of the image pickup device increases, and as a receiving area per element decreases, the sensitivity reduces, which presents a problem of unable to reduce the relatively increasing noise sufficiently.

More specifically, although the luminance noise can be reduced by the coring and the color noise can be reduced by the low-pass filtering to some extent, the actual acquired image has random noise over the entire image rather than spot noise. Accordingly, the noise diffused by the color interpolation overlap on each other, and the original image signal is buried in the noise. Thus, it is difficult to remove the luminance noise or color noise after converting to the luminance/color difference signals.

The present invention is implemented to solve the foregoing problems. Therefore it is an object of the present invention to provide an image processing method capable of preventing the noise superimposed on the pixel of interest from being diffused to the neighboring pixels, and capable of reducing the noise sufficiently.

DISCLOSURE OF THE INVENTION

According to one aspect of the present invention, an image processing method includes an edge intensity value calculation step of calculating an edge intensity value in a neighborhood of a pixel of interest from feature values of micro regions calculated by a feature value calculation step; and a filter value calculation step of calculating a low-pass filter value of the pixel of interest from image signal values of neighboring pixels which have a same color component as the pixel of interest, and corrects the image signal value of the pixel of interest by using the edge intensity value calculated by the edge intensity value calculation step and the low-pass filter value calculated by the filter value calculation step.

This offers an advantage of being able to prevent noise superimposed on the pixel of interest from being diffused to neighboring pixels, and to reduce the noise sufficiently.

BRIEF DESCRIPTION OF THE DRAWINGS

FIG. 7 is a diagram illustrating a pixel window and the like;

FIG. 8 is a diagram illustrating a feature value window;

FIG. 9 is a diagram illustrating weighting factors;

FIG. 12 is a diagram illustrating a luminance signal, color difference signals and so forth;

FIG. 13 is a diagram illustrating a luminance signal, color difference signals and so forth;

FIG. 15 is a diagram illustrating G-component distribution of neighboring pixels;

FIG. 18 is a diagram illustrating binary distribution; and

FIG. 19 is a diagram illustrating noise reduction processing and the like of the embodiment 4.

BEST MODE FOR CARRYING OUT THE INVENTION

The best mode for carrying out the invention will now be described with reference to the accompanying drawings to explain the present invention in more detail.

Embodiment 1

Figure 1:
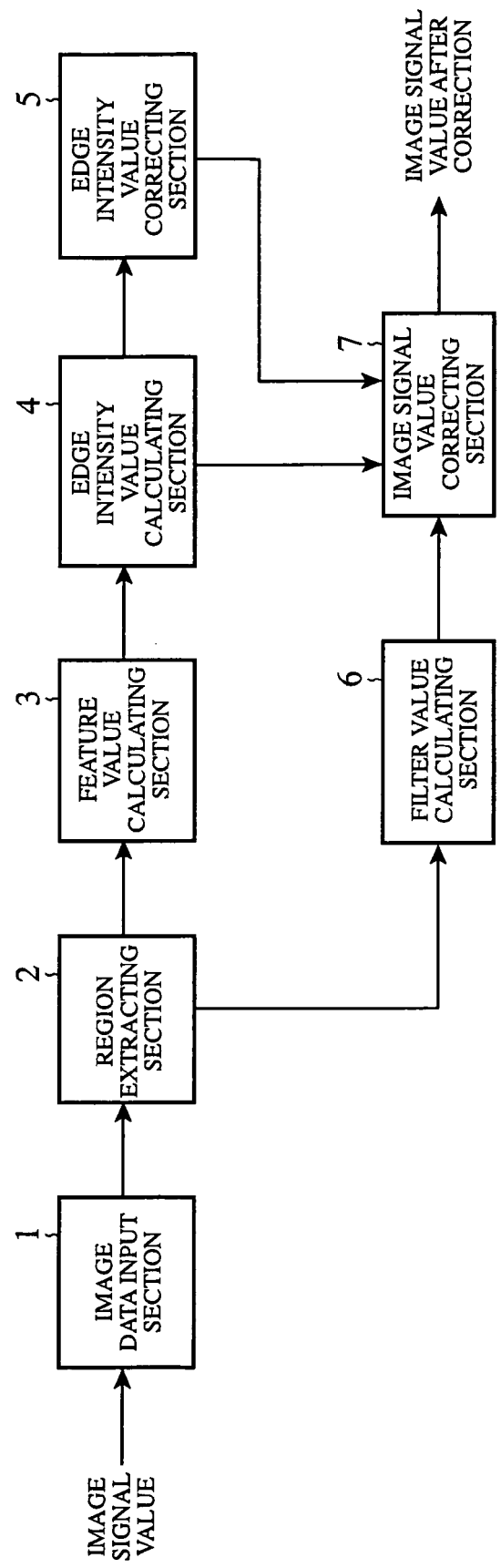
FIG. 1 is a block diagram showing a configuration of an image processing apparatus employing an image processing method of an embodiment 1 in accordance with the present invention.

FIG. 1 is a block diagram showing a configuration of an image processing apparatus employing an image processing method of an embodiment 1 in accordance with the present invention. In FIG. 1, an image data input section 1 inputs a pickup color signal (image signal values) acquired by an image pickup device in which two-dimensionally arrayed individual pixels each have one of color filters of the additive primary colors. A region extracting section 2 extracts a specified region around a pixel of interest to be subjected to noise reduction processing from a pickup region by the image pickup device, and extracts the pickup color signal of the specified region. A feature value calculating section 3 calculates feature values in micro regions in the specified region from the pickup color signal of the specified region extracted by the region extracting section 2. Specifically, using the pickup color signals output from the R-color filter, G-color filter and B-color filter corresponding to the micro regions in the specified region, the feature value calculating section 3 calculates the feature values of the micro regions.

An edge intensity value calculating section 4 calculates edge intensity values near the pixel of interest from the feature values of the micro regions calculated by the feature value calculating section 3. An edge intensity value correcting section 5 corrects the edge intensity values calculated by the edge intensity value calculating section 4 in accordance with an edge intensity correction curve.

A filter value calculating section 6 calculates a low-pass filter value of the pixel of interest from the pickup color signal of the neighboring pixels with the same color component as the pixel of interest.

An image signal value correcting section 7, using the edge intensity values calculated by the edge intensity value calculating section 4 and the edge intensity values corrected by the edge intensity value correcting section 5, carries out weighted addition of the image signal values and the low-pass filter value of the pixel of interest, thereby correcting the image signal value of the pixel of interest.

Figure 2:
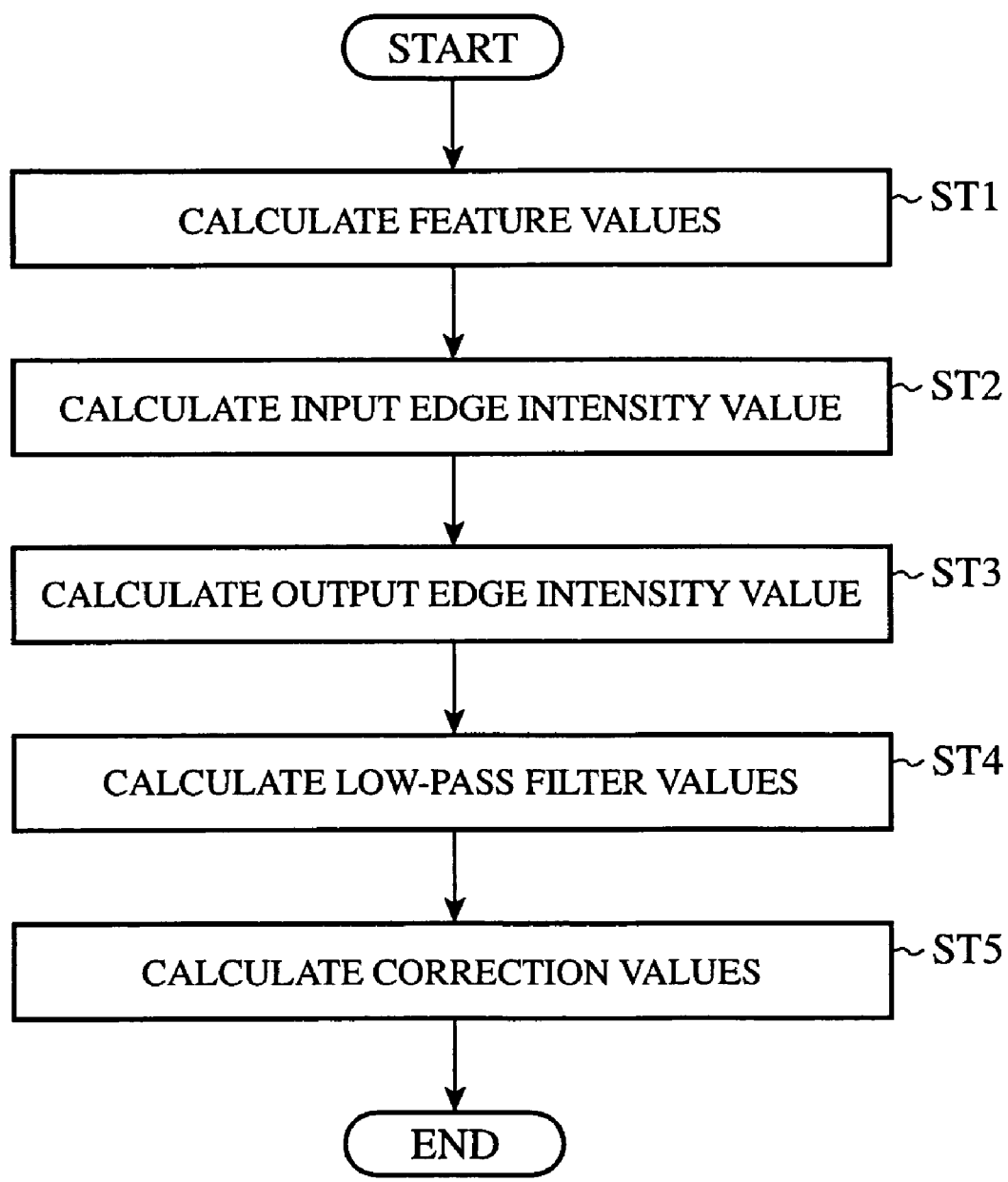
FIG. 2 is a flowchart illustrating the image processing method of the embodiment 1 in accordance with the present invention.

FIG. 2 is a flowchart illustrating the image processing method of the embodiment 1 in accordance with the present invention.

Next, the operation will be described.

Figure 3:
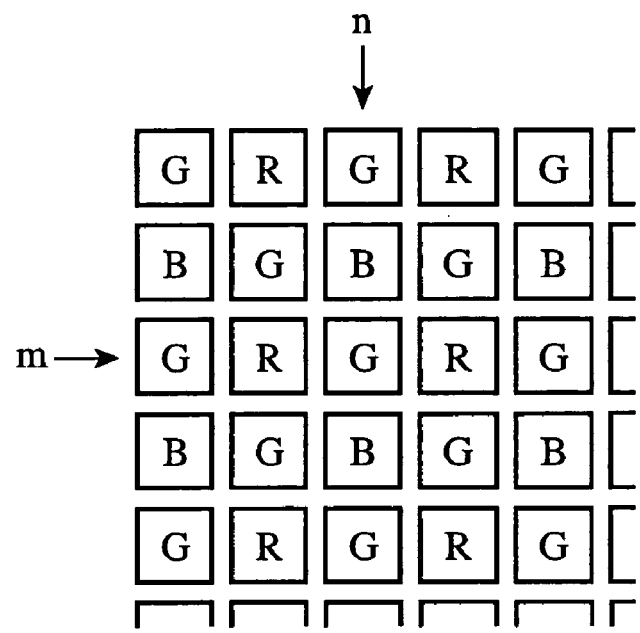
FIG. 3 is a diagram illustrating a color filter array in a single-chip image pickup device.

Assume that the image processing apparatus of the embodiment 1 employs a single-chip image pickup device in which color filters of R, G, B additive primary colors are arrayed in Bayer type as shown in FIG. 3.

In FIG. 3, R signal, G signal and B signal are pickup color signals sampled at individual pixel locations of the photoelectric conversion elements, where R designates red (R signal), G designates green (G signal) and B designates blue (B signal).

First, a procedure of obtaining full-color image will be described briefly. It is carried out by generating non-pickup color signals by color interpolation using the pickup color signals which are the results of the acquisition by the single-chip image pickup device to which the primary color filters are attached. Here, the image processing apparatus of the present embodiment 1 obtains the full-color image by carrying out the color interpolation after performing the noise reduction processing.

To generate the full-color image, in which each pixel has all the RGB components, from the pickup results of the image pickup device having the color filters arranged as shown in FIG. 3, it is necessary to generate two non-pickup color signals besides the filter color (pickup color) of each pixel.

Figure 4:
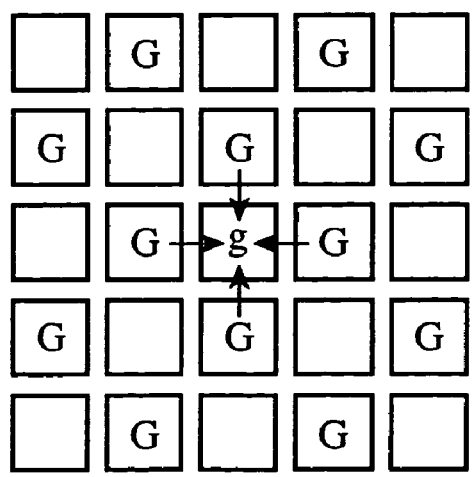
FIG. 4 is a diagram illustrating linear interpolation of a G signal.

For example, focusing attention on the G signal, the pickup color signals of the G signal (represented by a capital letter G in FIG. 4) are present at locations as shown in FIG. 4 in the pickup results of the image pickup device. The general conventional linear interpolation calculates by interpolation the G signal level (represented by a small letter "g" in FIG. 4) of the pixel without the G signal from the average of the four pixels, the upper, lower, right and left pixels, thus obtaining the G signals of all the pixels.

Figure 5:
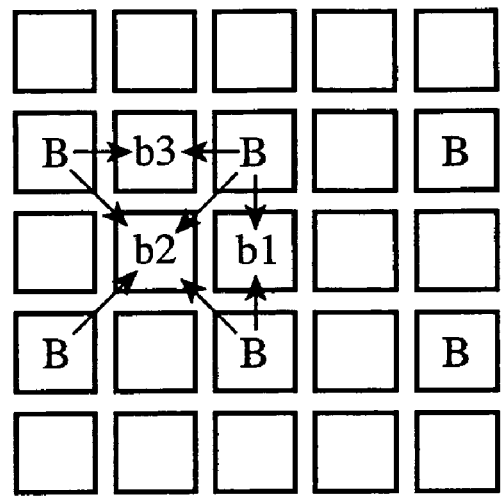
FIG. 5 is a diagram illustrating linear interpolation of a B signal.

Likewise, focusing attention on the B signals, the B signals of all the pixels are obtained as illustrated in FIG. 5. Specifically, a b1 signal of a middle pixel is generated by interpolation from the B signals of the upper and lower pixels, a b2 signal of a central pixel is generated by interpolation from the B signals of the upper, lower, right and left pixels, and a b3 signal of a middle pixel is generated by interpolation from the B signals of the right and left pixels.

Figure 6:
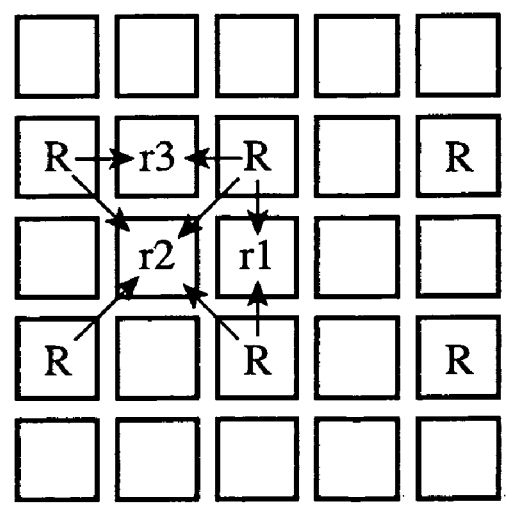
FIG. 6 is a diagram illustrating linear interpolation of an R signal.

As for the R signals, the R signals of all the pixels are obtained in the same manner as the B signal as illustrated in FIG. 6.

In this way, the R, G, B signals are obtained in all the pixels.

Next, the noise reduction processing by the image processing apparatus of the present embodiment 1 will be described in detail.

First, the image data input section 1 inputs the image signal values, that is, the pickup color signals of the individual pixels acquired by the single-chip image pickup device.

Figure 7:
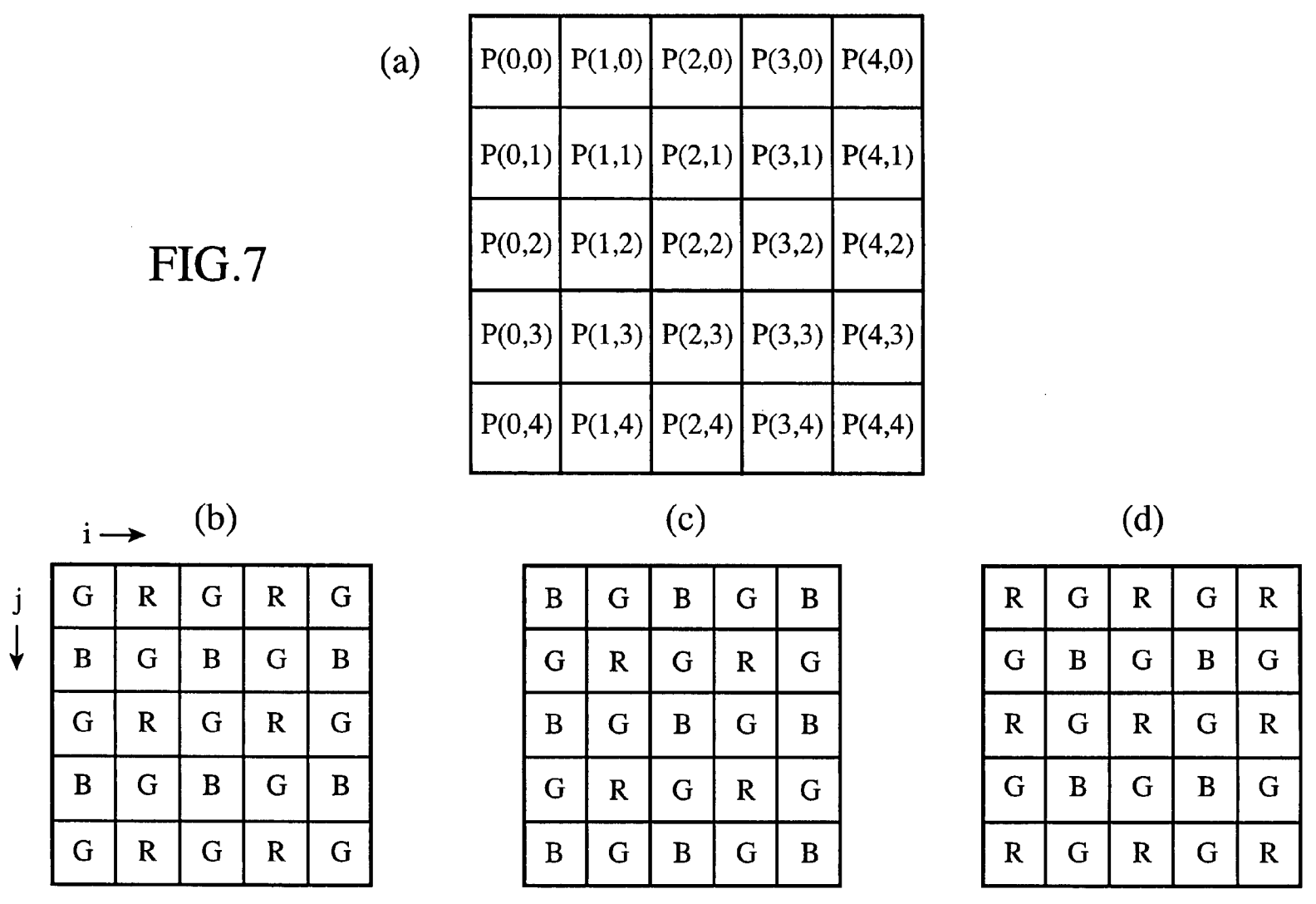

The region extracting section 2, receiving the pickup color signals of the individual pixels from the image data input section 1, extracts a 5×5 pixel specified region (called "pixel window" from now on), the center of which is the pixel of interest P(2,2), to be subjected to the noise reduction processing, from the pickup region of the image pickup device as illustrated in FIG. 7($a$), and outputs the pickup color signals of the pixels in the pixel window.

FIGS. 7($b$), 7($c$) and 7($d$) are diagrams illustrating pixel arrangement in the pixel windows actually extracted. Depending on whether the pixel of interest has a G component, R component or B component, these three cases take place.

The feature value calculating section 3, receiving the pickup color signals of the pixels in the pixel window from the region extracting section 2, calculates the feature values of the micro regions in the pixel window.

More specifically, the feature value calculating section 3 defines a region having four pixels $P(i,j)$, $P(i+1,j)$, $P(i,j+1)$ and $P(i+1,j+1)$ (where $0 \leq i \leq 3$, $0 \leq j \leq 3$) as a micro region including the R component, G component and B component in the pixel window having the pixel of interest P(2,2) as its center.

Then, the feature value calculating section 3 calculates for each micro region the feature value $D(i,j)$ by substituting the pickup color signals of the pixels constituting the micro region into the following expression (1) (step ST1).

$$D(i,j)=(P(i,j)+P(i+1,j)+P(i,j+1)+P(i+1,j+1))/4 \quad (1)$$

Carrying out expression (1) for the entire pixel window generates a 4×4 feature value window as illustrated in FIG. B.

For example, when i=0 and j=0, the pixels constituting the micro region are P(0,0), P(1,0), P(0,1) and P(1,1), and the feature value of the micro region is D(0,0).

In addition, when i=2 and j=2, the pixels constituting the micro region are P(2,2), P(3,2), P(2,3) and P(3,3), and the feature value of the micro region is D(2,2).

When the feature value calculating section 3 calculates the feature values of the individual micro regions, the edge intensity value calculating section 4 calculates the edge intensity value (called "input edge intensity value Ed1" from now on) in the neighborhood of the pixel of interest from the feature values of the individual micro regions (step ST2).

More specifically, the edge intensity value calculating section 4 multiplies the feature values in the feature value window as illustrated in FIG. 8 by weighting factors as illustrated in FIG. 9, adds the individual multiplication results as in the following expression (2), and calculates the input edge intensity value Ed1 in the feature value window.

$$\begin{aligned}Ed1 = |3 \times (D(1,1) + D(1,2) + D(2,1) + D(2,2)) - \\ (D(0,0) + D(1,0) + D(2,0) + D(3,0) + D(0,1) + \\ D(3,1) + D(0,2) + D(3,2) + D(0,3) + \\ D(1,3) + D(2,3) + D(3,3))|\end{aligned} \quad (2)$$

When the edge intensity value calculating section 4 calculates the input edge intensity value Ed1, the edge intensity value correcting section 5 corrects the input edge intensity value Ed1 in accordance with a preset edge intensity correction curve (see FIG. 10), and outputs an output edge intensity value Kout as the input edge intensity value Ed1 after the correction (step ST3).

More specifically, the edge intensity value correcting section 5 calculates the output edge intensity value Kout by substituting the input edge intensity value Ed1 into a function f representing the edge intensity correction curve as shown in the following expression (3).

$$Kout=f(Ed1) \quad (3)$$

Figures 10, 11:
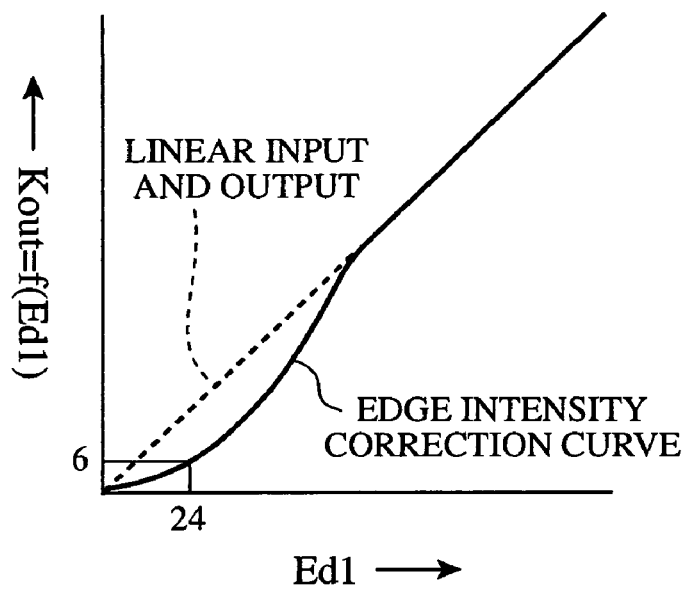
FIG. 10 is a diagram illustrating an edge intensity correction curve.
FIG. 11 is a diagram illustrating a feature value window.

Although the function f(Ed1) representing the edge intensity correction curve outputs the output edge intensity value Kout proportional to the input edge intensity value Ed1 when the input edge intensity value Ed1 is large as illustrated in FIG. 10, when the input edge intensity value Ed1 is small, the function outputs a smaller output edge intensity value Kout. A dotted line in FIG. 10 represents the case where the input and output are linear.

Here, although the description is made by way of example having the predetermined edge intensity correction curve as shown in FIG. 10, this is not essential. For example, the edge intensity correction curve can be divided into subdivisions in accordance with the input edge intensity value Ed1, and the subdivisions of the edge intensity correction curve can undergo linear approximation. Thus, in the calculation of the output edge intensity value Kout, the quadratic or higher order expression can be replaced by a linear expression. This means that when implementing the present image processing method by an electronic circuit, it is possible to reduce the circuit scale. In addition, when implementing the present image processing method by a program, it offers an advantage of being able to speed up the calculation.

In addition, a configuration is also possible that prestores the output edge intensity values Kout corresponding to the input edge intensity values Ed1 in a memory such as a lookup table in advance, and that the edge intensity value correcting section 5 refers to the output edge intensity value Kout corresponding to the input edge intensity value Ed1.

The filter value calculating section 6, receiving the pickup color signals of the pixels in the pixel window from the region extracting section 2, calculates a low-pass filter value Plpf of the pixel of interest by substituting the pickup color signals of the neighboring pixels with the same color component as the pixel of interest into the following expression (4) (step ST4)

$$\begin{aligned}Plpf = (P(0,0) + P(2,0) + P(4,0) + P(0,2) + \\ P(4,2) + P(0,4) + P(2,4) + P(4,4))/8\end{aligned} \quad (4)$$

When the filter value calculating section 6 calculates the low-pass filter value Plpf of the pixel of interest, the image signal value correcting section 7 corrects the image signal value of the pixel of interest P(2,2) by carrying out the weighted addition of the image signal value, that is, the pickup color signal of the pixel of interest P(2,2), and the low-pass filter value Plpf using the input edge intensity value Ed1 calculated by the edge intensity value calculating section 4 and the output edge intensity value Kout calculated by the edge intensity value correcting section 5 as shown in the following expression (5).

$$P'(2,2)=\{Kout \times P(2,2)+(Ed1-Kout) \times Plpf\}/Ed1 \quad (5)$$

Thus, the noise contained in the pickup results of the image pickup device is reduced. To make the effect clear, it will be described using concrete values. It is assumed here that during the acquisition by the image pickup device of FIG. 13(*a*), the noise as shown in FIG. 13(*b*) occurs. For the sake of simplicity, it is assumed that the pickup results of the image pickup device are represented by 256 values from 0 to 255.

In this case, the feature value calculating section 3 generates the feature value window D(i,j) as illustrated in FIG. 11 by calculating expression (1).

The edge intensity value calculating section 4 obtains the input edge intensity value Ed1 in the feature value window by calculating expression (2).

$$Ed1=3\times(2+2+2+2)-0=24$$

The edge intensity value correcting section 5 calculates the output edge intensity value Kout by calculating expression (3). In the case where the edge intensity correction curve of FIG. 10 is set, when the input edge intensity value Ed1 is "24", the output edge intensity value Kout is "6".

$$Kout=f(24)=6$$

The filter value calculating section 6 obtains the low-pass filter value Plpf of the pixel of interest by calculating expression (4).

$$Plpf=(0+0+0+0+0+0+0+0)/8=0$$

The image signal value correcting section 7 corrects the image signal value of the pixel of interest P(2,2) by calculating expression (5).

$$P'(2,2)=\{6\times 8+(24-6)\times 0\}/24=2$$

Thus, it is found that the noise component in the pickup results of the image pickup device is reduced from "8" to "2".

After the noise reduction processing thus carried out, the above-mentioned color interpolation is performed, and the pickup results of the image pickup device become as illustrated in FIG. 12.

More specifically, when the pickup results of FIG. 12(*a*) passing through the noise reduction processing are input to undergo the color interpolation, the R-component, G-component and B-component as illustrated in FIGS. 12(*b*), 12(*c*) and 12(*d*) are generated by interpolation.

Then, the luminance/color difference signals are generated using general conversion expressions.

$$Y=0.29900 \times R+0.58700 \times G+0.11400 \times B$$

$$Cb=-0.16874 \times R-0.33126 \times G+0.50000 \times B+128$$

$$Cr=0.50000 \times R-0.41869 \times G-0.08131 \times B+128 \quad (6)$$

where Y designates the luminance signal, and Cb and Cr designate color difference signals. As for the color difference signals, they are made positive by adding 128 to them to facilitate the calculations below.

When generating the luminance/color difference signals in this way according to expression (6), the luminance signal becomes as illustrated in FIG. 12(*e*), and the color difference signals become as illustrated in FIGS. 12(*f*) and 12(*g*).

On the other hand, when carrying out the color interpolation before performing the noise reduction processing as in the conventional example, that is, when carrying out the color interpolation by inputting the pickup results of FIG. 13(*b*), The R-component, G-component and B-component are generated by interpolation as illustrated in FIGS. 13(*c*), 13(*d*) and 13(*e*).

Then, when the luminance/color difference signals are generated using the conversion expression (6) in the same way as described above, the luminance signal becomes as illustrated in FIG. 13(*f*), and the color difference signals become as illustrated in FIGS. 13(*g*) and 13(*h*).

Comparing FIG. 12 with FIG. 13, it is found that the image processing method of the present embodiment 1 can effectively reduce the luminance noise and color noise in the pixel of interest, and that color interpolation and luminance/color difference conversion processing are carried out without diffusing the noise component which is diffused to the neighborhood of the pixel of interest in the conventional example.

As is clear from the above description, the present embodiment 1 is configured such that it includes the edge intensity value calculating section 4 for calculating the edge intensity value in the neighborhood of the pixel of interest from the feature values of the micro regions calculated by the feature value calculating section 3; the edge intensity value correcting section 5 for correcting the edge intensity value calculated by the edge intensity value calculating section 3 in accordance with the edge intensity correction curve; and the filter value calculating section 6 for calculating the low-pass filter value of the pixel of interest from the image signal values of the neighboring pixels with the same color component as the pixel of interest, and that corrects the image signal value of the pixel of interest by carrying out the weighted addition of the image signal value and the low-pass filter value of the pixel of interest using the edge intensity values before and after the correction. Thus, the present embodiment 1 offers an advantage of being able to reduce the noise sufficiently without diffusing the noise superimposed on the pixel of interest to the neighboring pixels.

Embodiment 2

Although the foregoing embodiment 1 is described by way of example that calculates the feature values of the micro regions by calculating expression (1), it is also possible to appropriately select a feature value calculation method including all the R, G and B components. More specifically, as long as the feature value calculation method includes all the color components, it is not limited to expression (1). For example, a method of carrying out weighted addition of the edge detection results of the individual color components in the pixel window can achieve certain effect.

In particular, when the surroundings of the pixel of interest include chromatic color edges, the method is effective to maintain the continuity between the remaining adjacent color pixels and the edge detection results, and by extension to maintain the continuity of the noise elimination effect.

In addition, although the foregoing embodiment 1 is described by way of example that multiplies the feature values calculated from expression (1) by weighting factors of FIG. 9 during the edge detection of the image pickup data, and adds the individual multiplication results as expression (2), this is not essential.

For example, depending on the spatial frequency characteristics of noise to be detected, using alone or in combination the parameter corresponding to the edge intensity value of a method other than that described in the foregoing embodiment 1 can increase the flexibility of the noise detection and improve the detection accuracy.

For example, it is possible to use the entire window of the pixel of interest of FIG. 7(a) as a micro region, to calculate first order derivative or second order derivative for each set of pixels with the same color component in the pixel window to estimate the edge distribution in the neighboring pixels on a color by color basis, and to reflect the results by adding to the edge intensity value Ed1. For example, when the pixel of interest is at an R pixel location, the edge intensity value Ed1' is calculated as the following expression.

$$EdR = |4 \times P(2,2) - P(2,0) - P(0,2) - P(4,2) - P(2,4)|$$

$$EdG = |P(2,1) - P(2,3)| + |P(1,2) - P(3,2)|$$

$$EdB = |P(1,1) - P(3,3)| + |P(3,1) - P(1,3)|$$

$$Ed1' = (Ed1 + EdR + EdG + EdB)/4 \qquad (7)$$

where EdR designates the input edge intensity value of the R-component, EdG designates the input edge intensity value of the G-component, and EdB designates the input edge intensity value of the B-component. In addition, Ed1 is the input edge intensity value in the feature value window calculated from expression (2).

Although the foregoing embodiment 1 is described by way of example that multiplies the weighting factors of FIG. 9 to carry out the edge detection from the feature values calculated from expression (1), this is not essential.

For example, the same advantages can be achieved by using other filter coefficients that enable edge detection such as the first order derivative or second order derivative of the feature values calculated from expression (1).

Furthermore, although the foregoing embodiment 1 is described by way of example that uses a 5×5 pixel window having its center at the pixel of interest as illustrated in FIG. 7(a), this is not essential.

For example, any window such as a 7×7 pixel window or 7×5 pixel window can be set freely, and according to the window, the shape of the feature value window of FIG. 8 and the individual calculation expressions can be changed.

In addition, although the foregoing embodiment 1 is described by way of example that obtains the low-pass filter value Plpf at the pixel of interest by calculating expression (4), this is not essential.

For example, it is possible to calculate the low-pass filter value Plpf only from the pixels in the horizontal and vertical directions of the pixel of interest P(2,2) of FIG. 7(a). Alternatively, it is also possible to carry out the weighted addition of the pixel values in the horizontal, vertical and oblique directions. Alternatively, when calculating the correction value P' (2,2) of the image signal value of the pixel of interest by calculating expression (5), it is also possible to carry out the weighted addition of the pixel of interest P (2,2) to the low-pass filter value Plpf in advance to prevent the component of the pixel of interest P(2,2) from becoming zero. Thus, a variety of methods can be used according to the characteristics of the pickup results and the purpose of the noise reduction processing.

Furthermore, when obtaining the correction value P'(2,2) of the image signal value of the pixel of interest by calculating expression (5), although the foregoing embodiment 1 carries out the weighted addition of the image signal value of the pixel of interest P(2,2) and the low-pass filter value Plpf, this is not essential.

For example, assuming that the contour emphasis is performed at a post stage in the image processing apparatus, it is possible in the calculation of expression (5) to use instead of the pixel of interest P(2,2) an image signal value of a pixel close to the pixel of interest P(2,2), which passes through low-pass filter weaker than the low-pass filter value Plpf, and to carry out the weighted addition with the low-pass filter value Plpf.

Thus, a configuration is also possible which de-emphasizes the edges over the entire screen to form a soft image, and then compensates for the sharpness of the edges by the contour emphasis.

Embodiment 3

The foregoing embodiment 1 is described by way of example that carries out the color interpolation after the noise reduction processing. However, since the noise reduction processing in the foregoing embodiment 1 must form the pixel window having the pixel of interest as its center, the noise reduction processing must have a line buffer for at least a few lines to implement it by an electronic circuit.

In this case, if the noise reduction processing is embedded in another image processing having a line buffer, no additional line buffer is required for the noise reduction processing, thereby offering an advantage of being able to limit the cost increase of the apparatus at a minimum.

Figure 14:
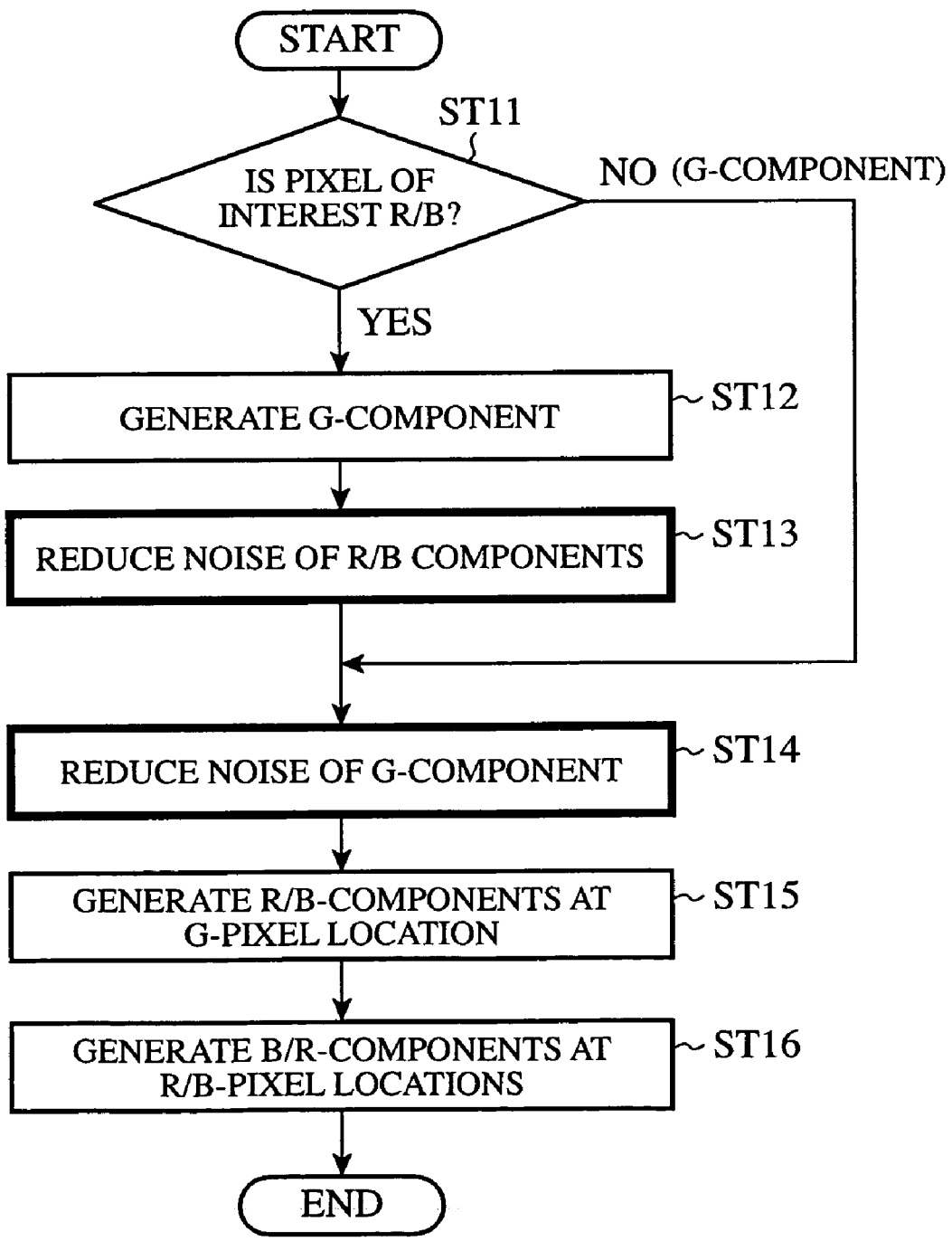
FIG. 14 is a flowchart illustrating an image processing method of an embodiment 3 in accordance with the present invention.

FIG. 14 is a flowchart illustrating the image processing method of the embodiment 3 in accordance with the present invention, which illustrates a method of carrying out the noise reduction processing during the color interpolation.

As the color interpolation method, a linear interpolation method is the simplest. However, using more complicated methods that can improve image quality becomes common in general image processing apparatuses. For example, the color interpolation method disclosed in Japanese patent application laid-open No. 2003-134523 will be described.

Japanese patent application laid-open No. 2003-134523 discloses a color interpolation method that implements high-resolution color interpolation by reproducing unevenness of edges with high fidelity by determining offset amounts in terms of estimated variations in colors to be generated by interpolation in accordance with variations of a reference color (color signal) in micro regions, which differs from the color component to be generated by interpolation in the pickup results of the image pickup device.

More specifically, a configuration that carries out first to third stage processing is disclosed. The first stage processing generates G-components at pixels whose pickup results of the pickup elements are an R-component (called "R-pixel locations" from now on), and generates G-components at pixels whose pickup results of the pickup elements are a B-component (called "B-pixel locations" from now on).

The second stage processing generates R-components and B-components at pixels whose pickup results of the pickup elements are a G-component (called "G-pixel locations" from now on).

The third stage processing generates B-components at R-pixel locations, and R-components at B-pixel locations.

The second and third stages have a configuration of carrying out the color interpolation that reuses as the reference colors the color signals generated by interpolation up to the previous stages. Accordingly, to implement the color interpolation method disclosed in Japanese patent application laid-open No. 2003-134523 by an electronic circuit, it is necessary for each stage to have a line buffer for at least a few lines to generate a processing window or to delay the original pixels and the pixels generated at previous stages. For example, the first stage requires a line buffer for five lines. The present embodiment 3 will now be described which has the 5-line buffer in the first stage of the color interpolation commonly used as a noise reduction processing buffer.

Next, the operation will be described.

When the pickup results of the image pickup device are input to a color interpolator not shown, the color interpolator extracts a 5×5 pixel window having the pixel of interest at its center in the same manner as the region extracting section 2 of FIG. 1.

When the pixel of interest is at an R-pixel location or B-pixel location (step ST11), the color interpolator carries out the G-component generating processing which is the first stage of the color interpolation (step ST12).

After performing the G-component generating processing at the R-pixel location or B-pixel location, the color interpolator carries out the noise reduction processing of the R-component or B-component of the pixel of interest in the same manner as the noise reduction processing in the foregoing embodiment 1 (performs the image processing method of FIG. 2) (step ST13).

Next, when the pixel of interest is at a G-pixel location, the color interpolator carries out the noise reduction processing of the image signal value of the pixel of interest (original image signal value of the image pickup device) in the same manner as the noise reduction processing in the foregoing embodiment (performs the image processing method of FIG. 2) (step ST14).

On the other hand, when the pixel of interest is at an R-pixel location or B-pixel location, the color interpolator carries out the noise reduction processing of the G-component generated at step ST12 (step ST14).

The noise reduction processing of the G-component generated at step ST12 differs from the noise reduction processing of the G-component at the G-pixel locations only in the calculation expression of the low-pass filter value Plpf. More specifically, assume that the G component generated at step ST12 is Pg(2,2), the G-component distribution of the neighboring pixels becomes as shown in FIG. 15. For example, the low-pass filter value Plpf is obtained by calculating the following expression (8).

$$Plpf = \{2 \times (P(2, 1) + P(1, 2) + P(3, 2) + P(2, 3)) + P(1, 0) + P(3, 0) + P(0, 1) + P(4, 1) + P(0, 3) + P(4, 3) + P(1, 4) + P(3, 4)\}/16 \quad (8)$$

After performing the noise reduction processing of the G-components as described above, the color interpolator generates R-components and B-components at G-pixel locations as the second stage processing (step ST15).

Finally, the color interpolator generates B-components at R-pixel locations and R-components at B-pixel locations as the third stage processing (step ST16).

Incidentally, as for the second and third stage processing in the color interpolation, since all the image signal values of the interpolation color and reference color undergo the noise reduction processing, the R-components or B-components generated by the interpolation according to the relative relationships of image signal values also have noise reduced signal levels.

As is clear from the description above, the present embodiment 3 sequentially scans the pickup results of the image pickup device, and carries out over the entire screen the color interpolation including the noise reduction processing as illustrated in FIG. 14. Thus, the present embodiment 3 offers an advantage of being able to obtain an effectively noise reduced RGB full-color image without involving the diffusion of noise. In addition, converting the output signal of the color interpolation to the luminance/color difference signals as needed can produce effectively noise reduced luminance/color difference signals.

Although the color interpolation including the noise reduction processing is the color interpolation disclosed in Japanese patent application laid-open No. 2003-134523 in the present embodiment 3, this is not essential. For example, the noise reduction processing can be embedded into the conventional linear interpolation method, or into other color interpolation processing using multiple line pickup results to achieve the same advantage by sharing the line buffer. In addition, before performing the color interpolation of the pickup results of the pickup elements, the noise reduction processing can be embedded into other image processing using a plurality of lines.

Embodiment 4

Figure 16:
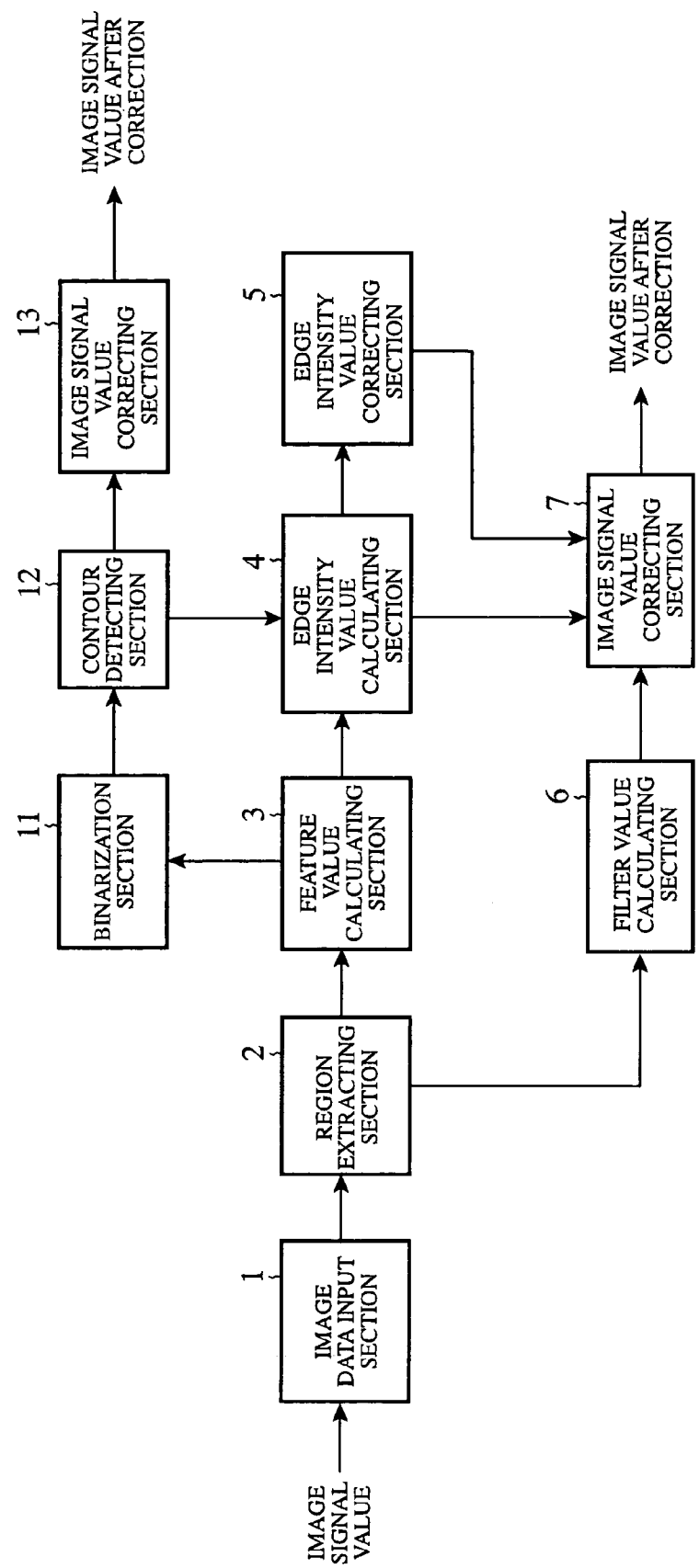
FIG. 16 is a block diagram showing a configuration of an image processing apparatus employing an image processing method of an embodiment 4 in accordance with the present invention.

FIG. 16 is a block diagram showing a configuration of an image processing apparatus employing an image processing method of an embodiment 4 in accordance with the present invention. In FIG. 16, the same reference numerals designate the same or like portions to those of FIG. 1, and the description of them is omitted here.

A binarization section 11 obtains an average value of the feature values of the micro regions calculated by the feature value calculating section 3, and binarizes the individual feature values by comparing them with the average value. A contour detecting section 12 detects a contour by carrying out pattern matching of preset binary distribution with the distribution of the feature values in the pixel window binarized by the binarization section 11.

When the contour detecting section 12 detects a contour, an image signal value correcting section 13, using the image signal values of a plurality of pixels including a pixel of interest in the same direction as that contour, corrects the image signal value of the pixel of interest.

Incidentally, in the present embodiment 4, the edge intensity value calculating section 4 calculates the input edge intensity value Ed1 when the contour detecting section 12 does not detect the contour, and does not calculate the input edge intensity value Ed1 when the contour is detected. Accordingly, only when the contour is not detected, the image signal value correcting section 7 outputs the image signal value after the correction.

Figure 17:
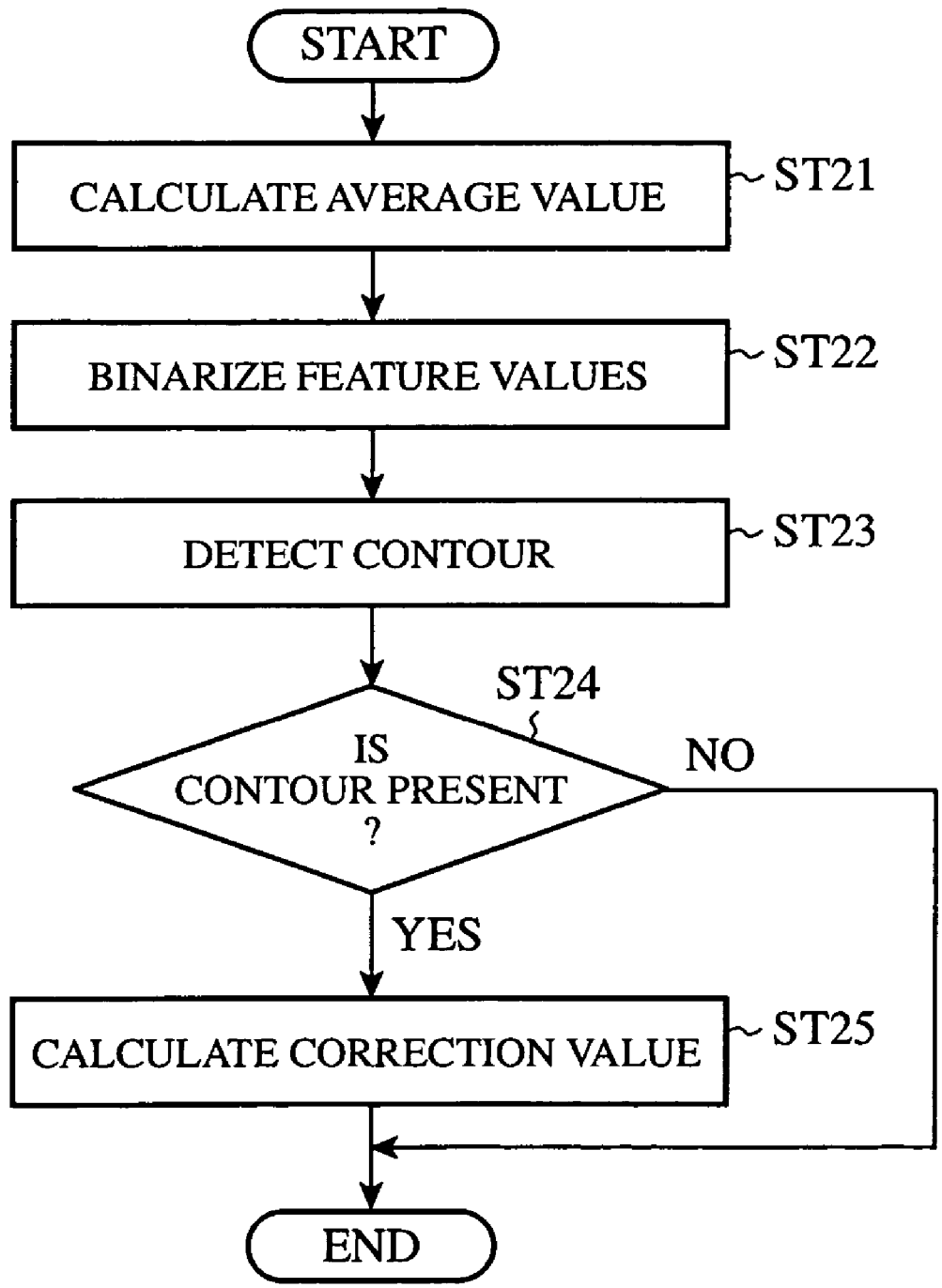
FIG. 17 is a flowchart illustrating the image processing method of the embodiment 4 in accordance with the present invention.

FIG. 17 is a flowchart illustrating the image processing method of the embodiment 4 in accordance with the present invention.

Next, the operation will be described.

First, receiving the pickup color signals of the pixels in the pixel window from the region extracting section 2, the feature value calculating section 3 calculates the feature values D(i,j) of the micro regions in the pixel window in the same manner as the foregoing embodiment 1.

When the feature value calculating section 3 calculates the feature values D(i,j) of the micro regions, the binarization section 11 calculates the average value Dave of the feature values D(i,j) by the following expression (9) (step ST21).

$$\text{Dave} = \sum_{i=0}^{3}\sum_{j=0}^{3} D(i,j)/16 \tag{9}$$

Then, the binarization section 11 compares the average value Dave with the individual feature values D(i,j). If the feature value D(i,j) is equal to or greater than the average value Dave, the binarization section 11 outputs Db(i,j)=1 as a binarization result of the feature value D(i,j).

In contrast, if the feature value D(i,j) is less than the average value Dave, the binarization section 11 outputs Db(i,j)=0 as the binarization result of the feature value D(i,j) (step ST22).

The contour detecting section 12 carries out the pattern matching of the preset binary distribution (see FIG. 18) with the distribution of the feature values in the pixel window, which are binarized by the binarization section 11, thereby performing the detection processing of the contour (step ST23).

Thus, the contour detecting section 12 makes the pattern matching of the distribution of the binarized feature values in the pixel window with the preset binary distribution. When they match, the contour detecting section 12 makes a decision that the contour is present, and that the pixel of interest is on a linear edge or is a pixel adjacent to the edge. In contrast, when they do not match, it make a decision that no contour is present (step ST24).

When the contour detecting section 12 does not detect the contour, the edge intensity value calculating section 4, edge intensity value correcting section 5, filter value calculating section 6 and image signal value correcting section 7 carry out their processing as in the foregoing embodiment 1, thereby calculating the correction value of the image signal value.

In contrast, when the contour detecting section 12 detects the contour, the image signal value correcting section 13, using the image signal values of a plurality of pixels including the pixel of interest in the same direction as the contour, corrects the image signal value of the pixel of interest (step ST25).

Carrying out the foregoing processing with scanning the entire screen sequentially enables the effective reduction of the noise adjacent to pixels on which edge is present as the image information.

FIG. 19 shows an example that processes the pickup results in which noise occurs adjacently to a contour. In FIG. 19, FIG. 19(a) shows a pixel window acquired by a single-chip image pickup device, in which the pixel of interest P(2,2) is assumed to be at a G-pixel location. FIG. 19(b) shows pixel values actually acquired in the pixel arrangement of FIG. 19(a), which has level "255" distributed on the background with a signal level "0", and has level "3" and level "20" distributed in the adjacent columns. In other words, a line is picked up in the vertical direction in FIG. 19(b), and the central pixel of the noise reduction processing has the noise with level "8".

FIG. 19(c) shows the conversion results of the pixel window of FIG. 19(b) to the feature values D(i,j) using expression (1).

In FIG. 19, when the noise reduction processing adjacent to the edge is performed in the present embodiment 4, the average value Dave becomes 67 according to expression (9), and the binarization results of the feature value window become as shown in FIG. 19(d).

On the other hand, when the preset binary distribution has distributions as shown in FIG. 18, it is detected that the pixel of interest is adjacent to the edge directed in the vertical direction by the pattern matching of the binarization results of FIG. 19(d) with the binary distribution of FIG. 18.

When the image signal value correcting section 13 applies the low-pass filter to the vertical direction a line constituting the edge makes, for example, the noise component in the contour can be reduced well as in the following expression.

$$P'(2,2) = \{P(2,0) + 2 \times P(2,2) + P(2,4)\}/4 \tag{10}$$
$$= (3 + 2 \times 8 + 3)/4$$
$$= 5$$

where P'(2,2) is the correction value of the pixel of interest P(2,2) after the noise reduction.

FIG. 19(e) shows G-component distribution when carrying out the color interpolation method disclosed in Japanese patent application laid-open No. 2003-134523 without performing the noise reduction processing; and FIG. 19(f) shows G-component distribution when carrying out the color interpolation method disclosed in Japanese patent application laid-open No. 2003-134523 after performing the noise reduction processing adjacent to the edge in the present embodiment 4.

From FIGS. 19(e) and 19(f), it is found that the noise reduction processing of the present embodiment 4 operates effectively.

The noise reduction processing of the present embodiment 4 can effectively reduce the noise adjacent to the edge, which is detected as an intense edge that holds image information, and is emphasized rather than de-emphasized in the contour emphasis processing by the conventional edge detection means.

Embodiment 5

Although the foregoing embodiment 4 is described by way of example that employs as the feature values used by the pattern matching the values calculated by expression (1), this is not essential. For example, any values into which all the RGB color components are mixed can be used effectively to detect a chromatic color edge, and hence can achieve the same advantage.

In addition, although the foregoing embodiment 4 is described by way of example in which the pixel window is 5×5 and the feature value window is 4×4, this is not essential. For example, any sizes can be used as the pixel window and feature value window.

Furthermore, although the foregoing embodiment 4 is described by way of example that carries out the pattern matching with the preset binarization pattern to detect the contour, this is not essential. For example, it is also possible to carry out direction detection of a contour by using a first order derivative filter output value or a second order derivative filter output value, which have a directional property as a filter coefficient.

Moreover, although the foregoing embodiment 4 is described by way of example that outputs the noise reduction processing results in the foregoing embodiment 1, or the noise reduction processing results adjacent to the edge, this is not essential. For example, it is also possible to calculate the weighted average of the noise reduction processing results in the foregoing embodiment 1 and the noise reduction processing results adjacent to the edge to output the results considering the two processing results.

In addition, although the foregoing embodiment 4 is described by way of example that uses the noise reduction processing of the foregoing embodiment 1 in combination for the pickup results of the single-chip image pickup device, this is not essential. In other words, it is also possible to use only the noise reduction processing adjacent to the edge.

Furthermore, it is also possible to embed the noise reduction processing adjacent to the edge of the present embodiment 4 into the color interpolation of the foregoing embodiment 3 or into other image processing. In this case, it can be embedded together with the noise reduction processing of the foregoing embodiment 1 to be used in combination, or embedded alone.

Furthermore, although the foregoing embodiment 4 is described by way of example that uses the pickup results of the single-chip image pickup device, this is not essential. For example, it is also possible to use the luminance signal as the feature values. In this case, when the luminance signal is a signal obtained by carrying out the color interpolation of the pickup results of the single-chip image pickup device, and by performing the luminance/color difference conversion, although the noise diffusion due to the color interpolation cannot be suppressed, suppressing the peak of the diffused noise offers an advantage of the noise reduction to some extent. Besides, it is also possible to use the signal obtained by the luminance/color difference conversion of the pickup results by the three-chip image pickup device. It is also applicable to image equipment in general such as facsimiles having image reader and image transmitter that bring about noise, copiers and television receivers.

In addition, it is obvious that the noise occurring on the color edge can be effectively reduced by applying the noise reduction processing of the foregoing embodiment 4 to the color difference signals.

Finally, although the foregoing embodiments 1-4 are described by way of example that uses the single-chip image pickup device whose color filters have primary colors and have the arrangement as shown in FIG. 3, this is not essential. For example, it is also possible to use other arrangements with the primary colors, or color filters with complementary colors. In addition, similar advantages can be achieved by using an image pickup device with an arrangement other than the square array, such as a honeycomb array.

INDUSTRIAL APPLICABILITY

As described above, when a consumer digital still camera or digital video camera that mounts a 2-D image pickup device such as a CCD acquires an image using the image pickup device, the image processing method in accordance with the present invention is suitable for eliminating noise included in the image signal.

What is claimed is:

1. An image processing method comprising:
   a feature value calculation step of calculating feature values of micro regions in a specified region having a pixel of interest at a center, from pickup results of an image pickup device that has a color filter with a particular color at each of pixels arrayed two-dimensionally;
   an edge intensity value calculation step of calculating an edge intensity value in a neighborhood of the pixel of interest from the feature values of the micro regions calculated by the feature value calculation step;
   a filter value calculation step of calculating a low-pass filter value of the pixel of interest from the image signal values of neighboring pixels which have a same color component as the pixel of interest; and
   an image signal value correction step of correcting the image signal value of the pixel of interest by using the edge intensity value calculated by the edge intensity value calculation step and the low-pass filter value calculated by the filter value calculation step, wherein said image signal value correction is performed either before or after a color interpolation.

2. The image processing method according to claim 1, further comprising an edge intensity value correction step of correcting the edge intensity value calculated in the edge intensity value calculation step in accordance with an edge intensity correction curve, wherein the image signal value correction step corrects the image signal value of the pixel of interest by carrying out weighted addition of the image signal value of the pixel of interest and the low-pass filter value using the edge intensity values before and after the edge intensity value correction.

3. The image processing method according to claim 1, wherein the feature value calculation step, using image signal values output from R-color filter, G-color filter and B-color filter corresponding to the micro regions in the specified region, calculates the feature values of the micro regions.

4. The image processing method according to claim 1, wherein when carrying out color interpolation of an image of the pixel of interest using pixel signal values of neighboring pixels, the feature value calculation step, the edge intensity value calculation step, the filter value calculation step and the image signal value correction step carry out the correction of the image signal value of the pixel of interest.

5. An image processing method comprising:
   a feature value calculation step of calculating feature values of micro regions in a specified region having a pixel of interest at a center, from pickup results of an image pickup device that has a color filter with a particular color at each of pixels arrayed two-dimensionally;
   a binarization step of binarizing the feature values of the micro regions calculated by the feature value calculation step;
   a contour detection step of detecting a contour using the feature values binarized by the binarization step; and
   an image signal value correction step of correcting an image signal value of the pixel of interest using image signal values of a plurality of pixels including the pixel of interest in a same direction as the contour detected by the contour detection step.

6. The image processing method according to claim 5, wherein the image signal value correction step corrects the image signal value of the pixel of interest by carrying out weighted addition of the image signal values of the plurality of pixels in the same direction as the contour.

7. The image processing method according to claim 5, wherein the contour detection step detects the contour by carrying out pattern matching of distribution of the feature values in the specified region binarized by the binarization step with preset binary distribution.

8. An image processing method comprising:
   a feature value calculation step of calculating feature values of micro regions in a specified region having a pixel of interest at a center, from pickup results of an image pickup device that has a color filter with a particular color at each of pixels arrayed two-dimensionally;
   a binarization step of binarizing the feature values of the micro regions calculated by the feature value calculation step;

a contour detection step of detecting a contour using the feature values binarized by the binarization step; and a first image signal value correction step of correcting, when the contour is detected by the contour detection step, an image signal value of the pixel of interest using image signal values of a plurality of pixels including the pixel of interest in a same direction as the contour detected by the contour detection step;

an edge intensity value calculation step of calculating, when the contour is not detected by the contour detection step, an edge intensity value in a neighborhood of the pixel of interest from the feature values of the micro regions calculated by the feature value calculation step;

a filter value calculation step of calculating a low-pass filter value of the pixel of interest from the image signal values of neighboring pixels which have a same color component as the pixel of interest; and a second image signal value correction step of correcting the image signal value of the pixel of interest by using the edge intensity value calculated by the edge intensity value calculation step and the low-pass filter value calculated by the filter value calculation step.

9. The image processing method of claim 5, said feature value calculation step further comprising calculating a low-pass filter value of the pixel of interest from image signal values of neighboring pixels which have the same color component as the pixel of interest.

* * * * *